Feb. 5, 1963   M. C. STEVENS   3,076,402
AIR DEFLECTOR
Filed Jan. 29, 1960   3 Sheets-Sheet 1

INVENTOR.
Myron C. Stevens
BY
Joseph A. Lemignani
Attorney

Feb. 5, 1963    M. C. STEVENS    3,076,402
AIR DEFLECTOR

Filed Jan. 29, 1960    3 Sheets-Sheet 2

INVENTOR.
Myron C. Stevens
BY Joseph A. Genignani
Attorney

Feb. 5, 1963  M. C. STEVENS  3,076,402
AIR DEFLECTOR
Filed Jan. 29, 1960  3 Sheets-Sheet 3
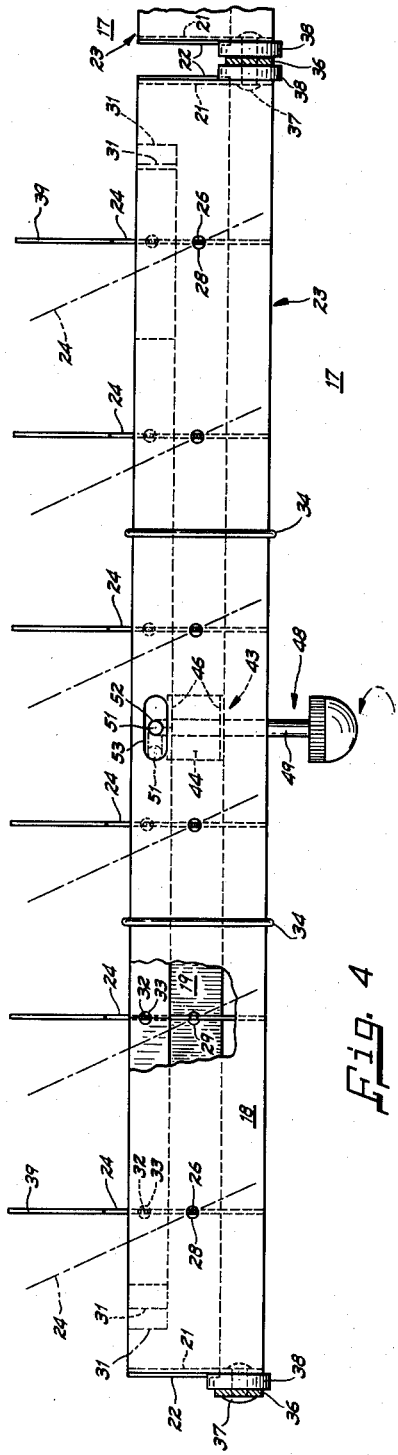
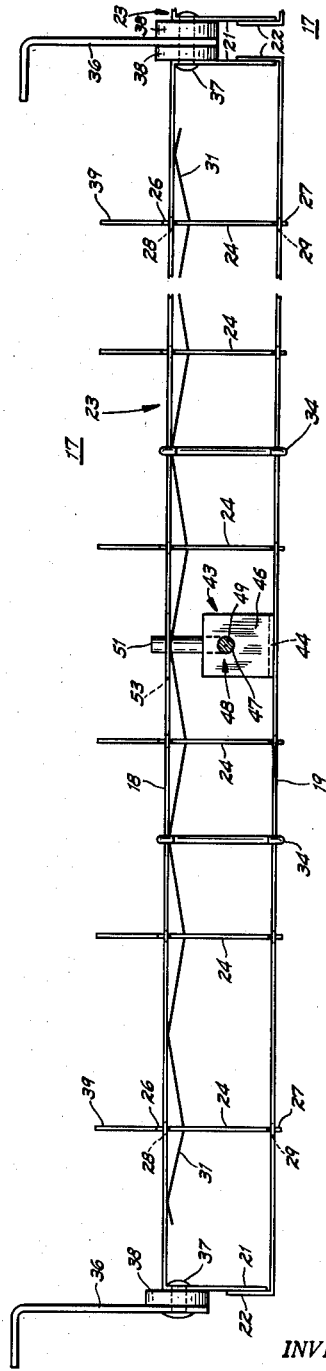
INVENTOR.
Myron C. Stevens
BY
Joseph A. Lemignani
Attorney ized Feb. 5, 1963

3,076,402
AIR DEFLECTOR
Myron C. Stevens, Evansville, Ind., assignor to McGraw-Edison Company, Milwaukee, Wis., a corporation of Delaware
Filed Jan. 29, 1960, Ser. No. 5,439
2 Claims. (Cl. 98—40)

This invention relates to air distribution equipment and more particularly to equipment for distributing conditioned air to a given area.

This invention contemplates the provision of an air deflector assembly for incorporation in air distributing equipment. The air deflector is provided with generally mutually perpendicular vanes interconnected and disposed so as to provide adequate control of air flow through the deflector in generally mutually perpendicular planes. The vanes are so disposed as to provide a compact air deflector and so interconnected as to be capable of actuation from a single control station. Further, the invention contemplates the provision of stop means to prevent short circuiting of air flow through the air distributing equipment.

Accordingly, it is an object of this invention to provide a compact air deflector which will control air flow in mutually perpendicular planes.

It is another object of this invention to provide an air deflector wherein air deflecting means for controlling the air flow in mutually perpendicular planes is actuated by a single control.

Still another object of this invention is to provide an air deflector for use in an air distributing unit which, while adequately controlling air flow, prevents short circuiting of the air flow through the unit.

A further object of this invention is to provide an air distributing unit having a stream of controlled discharge air which will have a high degree of penetration into the area being serviced before diffusion of the air occurs.

These and other objects and advantages of this invention will be more readily apparent from a reading of the following description in connection with the drawings in which:

FIG. 4 is a top view of the air deflector.

FIG. 5 is a front view of the air deflector.

Figure 1:
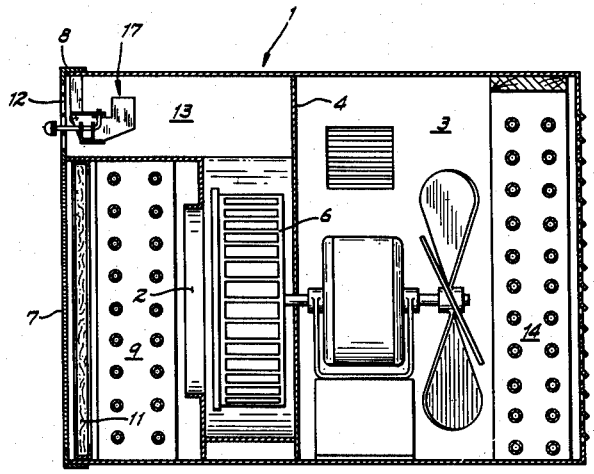
FIG. 1 is a cross-sectional side view of an air conditioning unit incorporating my invention.

Although the air deflector of this invention may be used with any air distributing unit, its preferred use is in combination with an air conditioning unit such as that shown in FIG. 1. The air conditioning unit has not been illustrated in detail, but has been merely shown semi-diagrammatically as the internal components of a standard air conditioner are well known to the man skilled in the art.

The air conditioner 1 includes an evaporator chamber 2 and a condenser chamber 3 which are separated one from the other by a wall panel 4. A centrifugal fan 6 is provided in the evaporator chamber 2 and is disposed behind an air inlet opening 7 provided in an air permeable front 8 of the air conditioner 1. Disposed intermediate the air inlet opening 7 and the centrifugal fan 6 is an evaporator assembly 9. Preferably, an air permeable filter 11 is disposed adjacent the air inlet opening 7 to remove impurities from the incoming air.

An air discharge opening 12 is preferably provided in the same wall as, and spaced relative to, the air inlet opening 7. Preferably the air inlet and air discharge openings are in vertically spaced relation. Disposed immediately behind the air discharge opening 12 is an air discharge passage 13.

In the evaporator chamber 2 the centrifugal fan 6 draws air through the air inlet opening 7 and into the fan 6. This air is expelled radially from the fan 6 and is directed through the air discharge passage 13 and out of the air discharge opening 12.

The condenser chamber 3 includes the usual condenser 14 and a propeller type fan 16. The refrigeration cycle is well known to those skilled in the art and hence will not be described.

To control the discharge of air from the air conditioner 1, air deflecting means is disposed within the air discharge passage 13 and adjacent the air discharge opening 12. The air deflecting means, in accordance with this invention preferably takes the form of an air deflector assembly 17. For reasons which will be more readily apparent after a reading of the following description, it is preferable to have two air deflector assemblies 17 disposed in end to end relation and extending the entire length of the air outlet opening 12, that is transversely of the opening 12.

Figure 3:
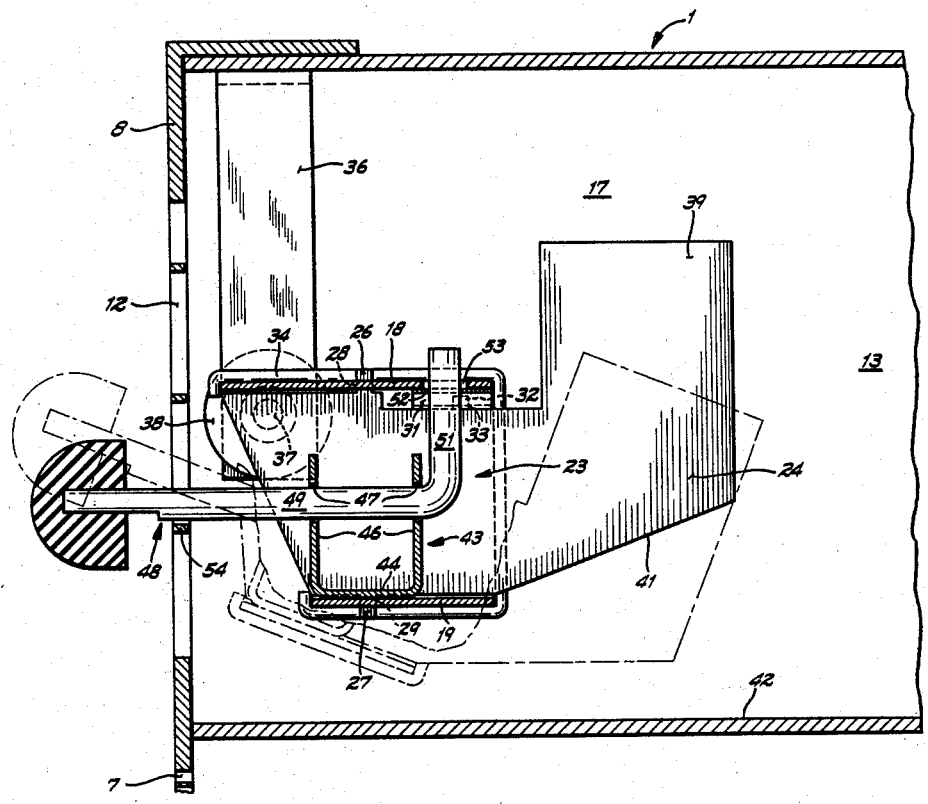
FIG. 3 is a partial cross-sectional view taken along lines 3—3 of FIG. 2.

Referring to FIGS. 3–5, the air deflector assemblies 17 will be discussed more specifically. Since both air deflector assemblies are identical only one will be described. The air deflector 17 preferably includes a pair of generally horizontal, elongated vanes 18 and 19. The ends of the vanes 18 and 19 are suitably formed to provide laterally extending portions 21 and 22 respectively. Portions 21 and 22 are interconnected, preferably by spot welding, and thus provide means for fixing the horizontal vanes in relatively spaced relation and cooperate with vanes 18 and 19 to form a substantially open frame 23.

A plurality of generally vertical vanes 24 are connected to the frame 23. Each of the vertical vanes 24 is provided with an upper tab portion 26 and a lower tab portion 27. Each of the horizontal vanes 18 and 19 is provided with apertures 28 and 29 in which the tab portions 26 and 27 are respectively disposed. The vertical vanes then are pivotally supported from the frame 23 and are movable relative thereto about a generally vertical axis defined by the tab portions 26 and 27. The dot-dash lines of FIG. 4 illustrate one of many possible positions for vanes 24.

Interconnecting the vertical vanes 24 is linking means which preferably takes the form of a continuous resilient flat spring member 31. Each of the vertical vanes 24 is provided with a third tab portion 32, which is hidden in FIG. 3 by the control means but can be seen in FIG. 4. The spring member 31 is provided with one aperture 33 for each vertical vane 24 and a tab 32 of each vertical vane 24 is disposed in a respective one of the apertures 33. The vertical vanes 24 are then interconnected and movement of one of the vanes or movement of the spring 31 will produce simultaneous movement of all vertical vanes 24. The spring 31 does not extend the full length of the frame 23 but stops short of the ends thereof so that movement of the spring 31 is possible.

To insure a rigid air deflector assembly 17, generally C-shaped spring clip members 34 may be provided to engage the horizontal vanes 18 and 19 as shown in FIG. 3 and may be suitably spaced as shown in FIG. 3.

Figure 2:
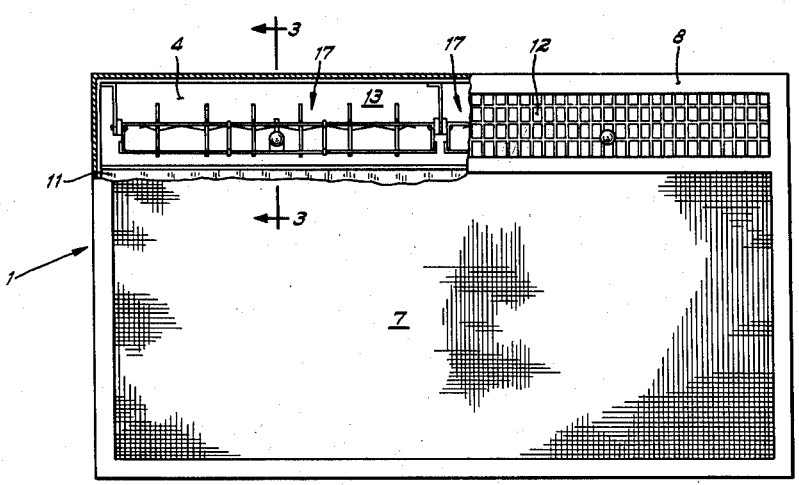
FIG. 2 is a front view of the air conditioner having a portion of the front broken away.

Referring to FIGS. 2 and 3, means is provided to pivotally mount the air deflector assembly in the air discharge passage 13 and adjacent the air discharge opening 12. This means includes an elongated support bracket 36 disposed at each end of the frame 23. Each support bracket 36 is fixed at its upper end to the air conditioner housing, preferably by spot welding, and is provided at its lower end with suitable aperture. A suitable aperture is also provided in the ends of the frame 23. A pin or rivet 37 passes through the apertures in the support bracket 36 and the frame end, and through a washer 38 which separates the frame 23 and support bracket 36. The air deflector assembly 17 is then pivotally mounted adjacent the air discharge opening 12 and may be rotated about a horizontal axis defined by the pins 37 and extending longitudinally of the horizontal vanes 18 and 19.

The frame 23 as illustrated by the dot-dash lines in FIG. 3, is then capable of movement about a generally horizontal axis to vary the angle of the horizontal vanes 18 and 19 relative to the air flow. The vertical vanes 24 being connected to the frame 23 will move therewith and, since they pivotally engage the frame 23, can also be rotated relative thereto about axes substantially perpendicular to said horizontal axis. Thus, a compact air deflecting means is provided which will control air flow in mutually perpendicular planes.

The vertical vanes 24 are preferably disposed within the frame 23, that is between the horizontal vanes 18 and 19 as this further contributes to a compact structure. However, to provide for effective control of a greater amount of air each of the vertical vanes 24 is also preferably provided with an extension 39 which extends vertically above the plane of the horizontal vane 18. Extension 39 will influence the flow of air over the frame 23 as the vane 24 influences the flow of air through the frame 23. Each vertical vane 24 is beveled, as at portion 41, to provide clearance between the air deflector 17 and the bottom wall 42 of the air discharge passage 13.

Single control means 43 is provided to control and actuate the horizontal vanes 18 and 19 and the vertical vanes 24. The control means 43 is fixed to the frame 23 and includes a U-shaped bracket 44 which preferably is attached to the lower horizontal vane 19, the attachment may be made in any suitable manner but is preferably by spot welding. The U-shaped bracket has two upwardly extending legs 46 each provided with an aperture 47. Also included in the control means 43 is an L-shaped actuating member 48. A longer leg 49 of the L-shaped actuating member 48 extends through the apertures 47 and the shorter leg 51 extends to and fits into an aperture 52 in the spring member 31. A portion of leg 51 extends beyond the spring 31 and into an elongated slot 53 provided in the upper horizontal vane 18 which acts as a stop to limit the motion of the leg 51. Actuation of the air deflector 17 is accomplished by raising the end of the leg 49 which extends through the ornamental front 8 to thereby vary the angle between the air flow and the horizontal vanes 18, 19. To vary the position of the vertical vanes 24 the actuating member 48 is rotated in the aperture 47 which then angularly displaces the shorter leg 51 of the actuating member 48 and displaces the spring 31 and correspondingly produces movement of the vertical vanes 24 about their respective axes. Thus a simple single control is provided for actuating the members which control the flow of air in both horizontal and vertical planes.

As has been stated above, only one air deflector assembly 17 can be used in any one air circulating unit however it is preferable to use two of such assemblies because greater control of air discharge can be achieved. That is, a greater variety of air flow patterns can be derived through the use of two air deflector assemblies 17.

In any air treating unit, which draws air into the unit for treatment and then discharges the treated air and where it is desirable for compactness to place the air inlet passage and air discharge passage relatively close to each other, the danger exists that the flow of discharge air may be directed into the flow of incoming air which would result in merely cycling the same air through the device, i.e. short circuiting the air flow through the unit.

To prevent short circuiting this invention contemplates the provision of stop means to limit the amount of deflection of the air discharge to prevent the mingling thereof with the incoming air flow. The stop means preferably takes the form of that illustrated in FIG. 4. The longer leg 49 of the actuating member 48 extends through the ornamental front 8 of the air conditioner 1. The longer leg 49 is disposed directly adjacent and above a portion 54 of the ornamental front. The portion 54 prevents movement of the actuating member 48 and air deflector 17, about its horizontally extending axis, to such an extent that the horizontal vanes 18 and 19 are pivoted to direct discharge air into the inlet air stream. Thus short circuiting of the air flow through the air conditioner is prevented by a simple and compact stop means.

It can also be seen that through use of this compact air deflector 17 a relatively narrow air outlet passage and air outlet opening may be used. The narrowness of the air outlet passage results in greater penetration of treated air into the area being serviced before diffusion occurs. Air which is discharged from an air conditioning unit, or any air distributing unit, immediately upon discharge has a tendency to diffuse. By restricting the passage through wihch the air is delivered the velocity and concentration of the air is thereby increased and therefore greater penetration results before detrimental diffusion can take place.

This invention then provides a compact, easily controlled and economical air deflector which while controlling air in mutually perpendicular planes can still be actuated from a single station. Also an air deflector is provided which includes means for preventing short circuiting of an air conditioning unit and one in which a high penetration of air into the area being served is available.

Although I have discussed my invention in relation to a particular embodiment and use thereof it is not intended that the invention be limited thereto and it is intended in the appended claims to encompass all embodiments and modifications of my invention which fall within the true spirit and scope thereof.

What I claim is:

1. An air deflector assembly adapted to control the flow of air from an air discharge passage and comprising, in combination, at least a pair of generally horizontal vanes, means for connecting said horizontal vanes in relatively spaced relation and cooperating therewith to provide a substantially open frame, means for mounting said frame in said air discharge passage for pivotal movement about a horizontal axis extending longitudinally of said horizontal vanes, a plurality of generally vertical vanes engaging and supported from said horizontal vanes, a pivotal connection between said horizontal and vertical vanes so that said vertical vanes are movable relative to said horizontal vanes and about a generally vertical axis, said vertical vanes having a first portion disposed between said horizontal vanes and a second portion extending generally laterally from said frame and in the direction of said vertical axis with an upwardly extending terminal portion projecting above the plane of the uppermost of said horizontal vanes for effecting deflection of air passing above said uppermost horizontal vane, resilient linking means interconnecting said vertical vanes for simultaneous movement, and single control means connected to one of said horizontal vanes and engaging said resilient connecting means for actuating said frame and said vertical vanes about their respective axes.

2. An air deflector assembly adapted to control the flow of air from an air discharge passage and comprising, in combination, a plurality of generally horizontal vanes, means for connecting said horizontal vanes in relatively spaced relation and cooperating therewith to provide a substantially open frame, means for mounting said frame in said air discharge passage for pivotal movement about a horizontal axis extending longitudinally of said horizontal vanes, a plurality of generally vertical relatively spaced vanes supported in said frame and each pivotally engaging said horizontal vanes for movement about a vertical axis, said vertical vanes having a first portion disposed between said horizontal vanes and a second portion extending generally laterally from said frame and in the direction of said vertical axis with an upwardly extending terminal portion projecting above the plane of the uppermost of said horizontal vanes for effecting deflection of air passing above said uppermost horizontal vane, linking means engaging and interconnecting each of said vertical vanes for simultaneous movement, and single control means engaging said horizontal vanes and said linking means for actuating said frame and said vertical vanes about their respective axes.

References Cited in the file of this patent

UNITED STATES PATENTS

| | | |
|---|---|---|
| 2,786,407 | Sarles | Mar. 26, 1957 |
| 2,874,626 | Goettl | Feb. 24, 1959 |
| 2,891,462 | Petrie | June 23, 1959 |
| 2,920,549 | Freitag | Jan. 12, 1960 |
| 2,928,333 | Madison | Mar. 15, 1960 |
| 2,940,375 | Schucker | June 14, 1960 |